(12) United States Patent
Danson et al.

(10) Patent No.: US 10,191,901 B2
(45) Date of Patent: *Jan. 29, 2019

(54) ENROLLMENT PAIRING ANALYTICS SYSTEM AND METHODS

(71) Applicant: Mattersight Corporation, Chicago, IL (US)

(72) Inventors: Christopher Danson, Austin, TX (US); Brittney Lynn McIngvale, Chicago, IL (US); Alain Stephan, Glenview, IL (US); Tomasz Stadnik, Chicago, IL (US); Samantha Shruti Desikan, Oak Park, IL (US); Roger Warford, Hoschton, GA (US)

(73) Assignee: MATTERSIGHT CORPORATION, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/718,916

(22) Filed: Sep. 28, 2017

(65) Prior Publication Data

US 2018/0018323 A1 Jan. 18, 2018

Related U.S. Application Data

(63) Continuation of application No. 14/046,019, filed on Oct. 4, 2013, now Pat. No. 9,779,084.

(51) Int. Cl.
*G06F 17/20* (2006.01)
*G06F 17/27* (2006.01)
*G06Q 50/20* (2012.01)

(52) U.S. Cl.
CPC ....... *G06F 17/2785* (2013.01); *G06Q 50/205* (2013.01)

(58) Field of Classification Search
USPC .................................. 704/8–10, 257
See application file for complete search history.

(56) References Cited

U.S. PATENT DOCUMENTS

| 6,160,987 A | 12/2000 | Ho et al. |
| 6,789,047 B1 | 9/2004 | Woodson |
| 8,108,193 B2 | 1/2012 | Chu et al. |
| 8,412,736 B1 | 4/2013 | Arnold et al. |

(Continued)

FOREIGN PATENT DOCUMENTS

WO WO 98/29818 7/1998

*Primary Examiner* — Leonard Saint Cyr
(74) *Attorney, Agent, or Firm* — Haynes and Boone, LLP (57) ABSTRACT

The methods, apparatus, and systems described herein facilitate instructor decision-making based on an analysis of communication(s) between an instructor and a student, including to provide predictions of student outcomes. The methods include receiving communication(s) posted by a student, detecting personality types along with keywords and phrases used by the student and the instructor with a psychologically-based linguistic analysis of the communication(s), scoring the student and instructor communications based on the detected keywords and phrases compared to a library of keywords and phrases, aggregating the student scores by personality type and instructor, correlating the student and instructor scores with historical student data, creating an evaluation report to provide guidance to the students for enrollment based on the correlated scores, and displaying the evaluation report on a student device.

20 Claims, 3 Drawing Sheets

(56) References Cited

U.S. PATENT DOCUMENTS

| | | |
|---|---|---|
| 8,472,862 B2 | 6/2013 | Yaskin |
| 2003/0046080 A1 | 3/2003 | Hejna, Jr. |
| 2004/0009462 A1 | 1/2004 | McElwrath |
| 2004/0180317 A1 | 9/2004 | Bodner et al. |
| 2006/0122834 A1 | 6/2006 | Bennett |
| 2006/0154226 A1 | 7/2006 | Maxfield |
| 2006/0188860 A1 | 8/2006 | Morrison |
| 2008/0254419 A1 | 10/2008 | Cohen |
| 2008/0254434 A1 | 10/2008 | Calvert |
| 2009/0103708 A1 | 4/2009 | Conway et al. |
| 2009/0157389 A1 | 6/2009 | Shaw |
| 2009/0299497 A1 | 12/2009 | Luko et al. |
| 2010/0009330 A1 | 1/2010 | Yaskin |
| 2010/0009331 A1 | 1/2010 | Yaskin |
| 2010/0009332 A1 | 1/2010 | Yaskin |
| 2010/0049520 A1 | 2/2010 | Stewart et al. |
| 2010/0285441 A1 | 11/2010 | Heffernan |
| 2011/0161107 A1 | 6/2011 | Goldberg et al. |
| 2011/0173225 A1 | 7/2011 | Stahl et al. |
| 2011/0258256 A1 | 10/2011 | Huberman et al. |
| 2012/0066142 A1 | 3/2012 | Jenkins |
| 2012/0196263 A1 | 8/2012 | Prevuznak |
| 2012/0203545 A1 | 8/2012 | Shaw |
| 2012/0244510 A1 | 9/2012 | Watkins, Jr. |
| 2012/0276514 A1 | 11/2012 | Haimowitz |
| 2012/0310629 A1 | 12/2012 | Stewart et al. |
| 2013/0004930 A1 | 1/2013 | Sorenson et al. |
| 2013/0078606 A1 | 3/2013 | White et al. |
| 2013/0095465 A1 | 4/2013 | Menon et al. |
| 2013/0096892 A1 | 4/2013 | Essa et al. |
| 2013/0246317 A1 | 9/2013 | Martin |
| 2013/0275154 A1 | 10/2013 | Kam et al. |
| 2013/0302774 A1 | 11/2013 | King et al. |
| 2013/0311409 A1 | 11/2013 | Ye et al. |
| 2014/0127656 A1 | 5/2014 | Healy |
| 2015/0100303 A1 | 4/2015 | Danson et al. |

ENROLLMENT PAIRING ANALYTICS SYSTEM AND METHODS

CROSS-REFERENCE TO RELATED APPLICATIONS

This application is a continuation of U.S. patent application Ser. No. 14/046,019, filed Oct. 4, 2013, now allowed, the entire contents of which is hereby incorporated herein by express reference thereto.

TECHNICAL FIELD

The present disclosure generally relates to a network, and methods, apparatus, and systems, that use predictive analytics in group learning environments, more particularly to provide students with enrollment guidance to pair students with instructors.

BACKGROUND OF THE DISCLOSURE

Electronic learning (also called e-Learning or eLearning) generally refers to education or learning where users (e.g., students, instructors, administrative staff, etc.) engage in education related activities using computers and other computing devices. For example, students may enroll or participate in a course or program of study offered by an educational institution (e.g., a college, university or grade school) through a web interface that is accessible over the Internet. Similarly, students may receive assignments electronically, participate in group work and projects by collaborating online, and be graded based on assignments and examinations that are submitted using an electronic dropbox.

Electronic learning often occurs without any face-to-face interaction between the users in the educational community. Accordingly, electronic learning overcomes some of the geographic limitations associated with more traditional learning methods, and may eliminate or greatly reduce travel and relocation requirements imposed on providers (e.g., faculty) and users of educational services.

Furthermore, because course materials can be offered and consumed electronically, there are fewer physical restrictions on learning. For example, the number of students that can be enrolled in a particular course may be practically limitless, as there may be no requirement for physical facilities to house the students during lectures. Furthermore, learning materials (e.g., handouts, textbooks, etc.) may be provided in electronic formats so that they can be reproduced for a virtually unlimited number of students. Finally, lectures may be recorded and accessed at varying times (e.g., at different times that are convenient for different users), thus accommodating students with varying schedules, and allowing students to be enrolled in multiple courses that might have a scheduling conflict when offered using traditional techniques.

Despite the effectiveness of some electronic learning systems, some students using electronic learning systems are unable to perform as well as their peers. For instance, the students in the electronic learning systems may not regularly attend physical classrooms for in-person interactions with other students or their instructors. As such, it may be difficult for an instructor to determine how engaged the students are, and to identify which students are at-risk of not succeeding in the course. Furthermore, even if the instructors are aware that some students are at-risk, it may be difficult for the instructor to diagnose why these students are at-risk and to determine the appropriate corrective action, as the instructors may not regularly interact with these students in person. Thus, improved systems and methods in electronic learning systems are needed.

SUMMARY

The present disclosure seeks to monitor and analyze student communications, and to predict the student's success based on the communications. The present methods extract information from the communications, use it to predict how a student will perform, and direct resources to the student if needed. In various embodiments, the student communications occur online in a classroom (whether electronic or physical), or outside of the classroom. In various embodiments, there is an online component to the class, whether or not there is a physical classroom used for a portion of the class.

In one aspect, the present disclosure relates to a system adapted to predict student performance. The system includes a node that includes a processor and a computer readable medium operably coupled thereto, and the computer readable medium includes a plurality of instructions stored in association therewith that are accessible to, and executable by, the processor. The plurality of instructions include instructions, that when executed, receive a communication posted by a student; instructions, that when executed, apply linguistic analysis to text of the communication to output a score for at least one student metric; and instructions, that when executed, predict a likelihood of a student outcome based on the score.

In a second aspect, the present disclosure relates to a method for predicting student performance. The method includes receiving a communication posted by a student; identifying keywords in text of the communication associated with one or more student metrics; scoring the communication for at least one student metric; and predicting a likelihood of a student outcome based on the score.

In a third aspect, the present disclosure relates to a non-transitory computer readable medium that includes a plurality of instructions. The plurality of instructions include instructions, that when executed, receive a communication posted by a student; instructions, that when executed, search for keywords in text of the communication associated with one or more student metrics; instructions, that when executed, score the communication for at least one student metric; instructions, that when executed, display a score for the at least one student metric; and instructions, that when executed, predict a likelihood of a student outcome based on the score.

In a fourth aspect, the present disclosure relates to an apparatus for predicting student performance that includes a database module adapted to receive a communication posted by a student; a scoring module adapted to apply one or more linguistic algorithms to text of the communication and to output a score for a student metric; and a performance prediction module adapted to use the score to predict a likelihood of a student outcome.

In a fifth aspect, the present disclosure relates to a system adapted to assist an instructor with interactions with students including: a network server including a processor and a computer readable medium operably coupled thereto, the computer readable medium including a plurality of instructions stored in association therewith that are accessible to, and executable by, the processor, where the plurality of instructions includes instructions that, when executed, receive a video communication posted by a student; instructions that, when executed, receive a video communication prepared by an instructor; instructions that, when executed, apply a psychologically-based linguistic analysis to the student video communication and the instructor video communication to determine a personality type of the student and to detect keywords and phrases used by the instructor; instructions that, when executed, apply a scoring algorithm to the detected instructor keywords and phrases; instructions that, when executed, generate a score for the instructor video communication from comparison of the detected keywords and phrases with a plurality of keywords and phrases stored in a library; and instructions that, when executed, create an evaluation report that provides guidance to the instructor to facilitate a responsive communication with the student based on the score for the instructor video communication, wherein the responsive communication is received on a student device.

In a sixth aspect, the present disclosure relates to a method for assisting instructors with interactions with students, which includes: receiving, at a network server, a video communication posted by a student; receiving, at a network server, a video communication prepared by an instructor; identifying, at a network server, keywords in the student video communication and instructor video communication associated with a personality type to predict a likelihood of a student outcome with the instructor; applying, at a network server, a scoring algorithm to the instructor video communication to detect keywords and phrases associated with teaching the student; generating, at a network server, a score for the instructor communication from comparison of the detected keywords and phrases with a plurality of keywords and phrases stored in a library; creating, at a network server, an evaluation report that provides guidance to the instructor to facilitate a responsive communication with the student based on the score for the instructor communication, and providing the responsive communication to the student on a student device.

In a seventh aspect, the present disclosure relates to a network server that includes a non-transitory, computer-readable medium including: instructions that, when executed, receive a video communication posted by a student; instructions that, when executed, receive a video communication prepared by an instructor; instructions that, when executed, search for keywords in the student video communication and the instructor video communication associated with a personality type to predict the likelihood of a student outcome with the instructor; instructions that, when executed, apply a psychologically-based linguistic analysis to the student video communication and the instructor video communication to determine a personality type of the student and to detect keywords and phrases used by the instructor; instructions that, when executed, apply a scoring algorithm to the detected instructor keywords and phrases; instructions that, when executed, generate a score for the instructor video communication from comparison of the detected keywords and phrases with a plurality of keywords and phrases stored in a library; and instructions that, when executed, create an evaluation report that provides guidance to the instructor to facilitate a responsive communication with the student based on the score for the instructor video communication, wherein the responsive communication is received on a student device.

In an eighth aspect, the present disclosure encompasses a system adapted to pair students with instructors for enrollment, including a network server comprising a processor and a computer readable medium operably coupled thereto, the computer readable medium comprising a plurality of instructions stored in association therewith that are accessible to, and executable by, the processor, where the plurality of instructions comprises: instructions that, when executed, receive a plurality of student and instructor communications; instructions that, when executed, apply a psychologically-based linguistic analysis to the plurality of student and instructor communications to determine a personality type of the students and the instructors and to detect keywords and phrases used by the students and instructors; instructions that, when executed, apply a scoring algorithm to the detected student and instructor keywords and phrases; instructions that, when executed, generate scores for each of the student communications and for the instructor communications from comparison of the detected keywords and phrases with a plurality of keywords and phrases stored in a library; instructions that, when executed, aggregate the student scores by personality type and by instructor; instructions that, when executed, correlate the aggregated student scores and instructor scores with historical student data; and instructions that, when executed, create an evaluation report that provides guidance for a plurality of students for enrollment based on the correlated scores, wherein the report is displayed on a student device.

In a ninth aspect, the present disclosure encompasses a method for pairing students with instructors for enrollment, which includes receiving, at a network server, a plurality of student and instructor communications; applying, at a network server, a psychologically-based linguistic analysis to the plurality of student and instructor communications to determine a personality type of the students and the instructors and to detect keywords and phrases used by the students and instructors; applying, at a network server, a scoring algorithm to the detected student and instructor keywords and phrases; generating, at a network server, scores for each of the student communications and for the instructor communications from comparison of the detected keywords and phrases with a plurality of keywords and phrases stored in a library; aggregating, at a network server, the student scores by personality type and by instructor; correlating, at a network server, the aggregated student scores and instructor scores with historical student data; creating, at a network server, an evaluation report that provides guidance for a plurality of students for enrollment based on the correlated scores; and displaying the evaluation report on a student device.

In a tenth aspect, the present disclosure encompasses a network server including a non-transitory, computer-readable medium that includes: instructions that, when executed, receive a plurality of student and instructor communications; instructions that, when executed, apply a psychologically-based linguistic analysis to the plurality of student and instructor communications to determine a personality type of the students and the instructors and to detect keywords and phrases used by the students and instructors; instructions that, when executed, apply a scoring algorithm to the detected student and instructor keywords and phrases; instructions that, when executed, generate scores for each of the student communications and for the instructor communications from comparison of the detected keywords and phrases with a plurality of keywords and phrases stored in a library; instructions that, when executed, aggregate the student scores by personality type and by instructor; instructions that, when executed, correlate the aggregated student scores and instructor scores with historical student data; and instructions that, when executed, create an evaluation report that provides guidance for a plurality of students for enrollment based on the correlated scores, wherein the report is displayed on a student device.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION OF THE PREFERRED EMBODIMENTS

The present disclosure advantageously analyzes online classroom communications or posts by students and makes predictions on the students' likely outcomes in the class. It is often desirable to identify at-risk students so that corrective action, if necessary, can be applied to those students to improve their likelihood of success. It may also be desirable to identify such at-risk students at earlier stages of one or more courses as this would provide those students more time to improve their likelihood of success in courses where they are at-risk. Accordingly, in some embodiments, the online posts are used to determine if a student needs resources, and resources are then directed to assist the student. It should be understood that a student may take in-person classes, online classes, or a combination thereof. In either case, the online posts herein can be made in class (whether physical or online) or outside of a classroom, in any event whether or not class is in session. For example, the class can be taught partly in classrooms and partly online, and the online post(s) may be made either during live class or not.

Using predictive models, the present methods and systems can take the classroom posts, aggregate the data, predict an outcome for the student, and direct appropriate resources to the student if needed. The present disclosure can also provide feedback to an instructor regarding teaching technique, and can predict student outcomes in future classes with that instructor (or a similar personality-type instructor) based on the personality type of the instructor and the student.

The methods include receiving a communication posted by a student, identifying keywords in text of the communication associated with one or more student metrics; scoring the communication for at least one student metric, and predicting a likelihood of a student outcome based on the score. The term "communication" or "communications" is meant herein to refer to a message, online post, comment, correspondence, or statement in any suitable form, including written, video, or audio form. The term "post" or "posted" is meant herein to refer generally to making a communication(s) available to an instructor, one or more students, or both. Thus, the term includes the common usage of the term, such as posting it on an internet wall or site, but also includes other modes of transmission as well.

Systems and apparatuses for carrying out these methods are also part of the present disclosure. An exemplary system to predict student performance includes, for example, a node including a processor and a computer readable medium operably coupled thereto, the computer readable medium comprising a plurality of instructions stored in association therewith that are accessible to, and executable by, the processor, where the plurality of instructions includes instructions, that when executed, receive a communication posted by a student, apply linguistic analysis to text of the communication to output a score for at least one student metric, predict a likelihood of a student outcome based on the score.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one of ordinary skill in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

Figure 1:
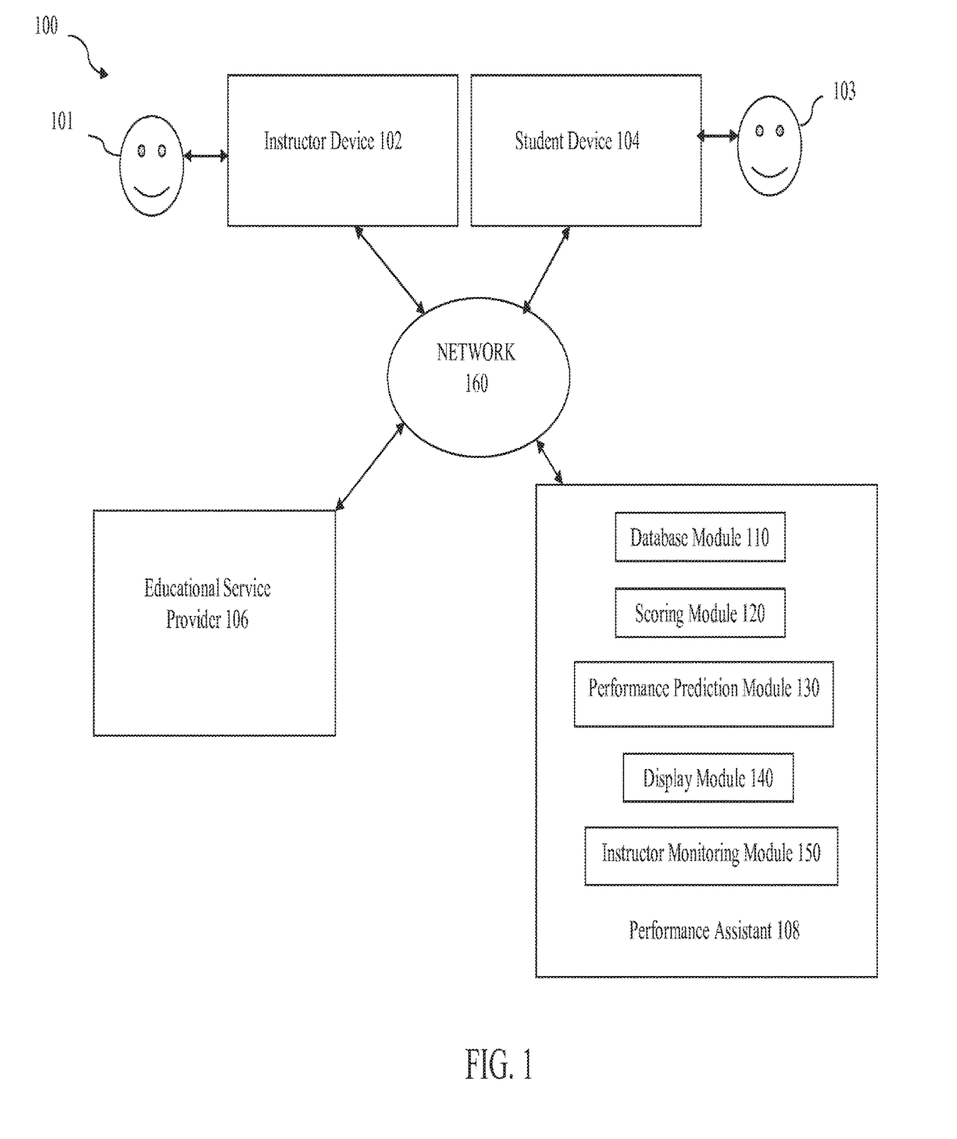
FIG. 1 is a block diagram of an embodiment of a system for predicting student performance according to various aspects of the present disclosure.

FIG. 1 depicts a schematic block diagram of an educational analytics system 100 in accordance with one or more embodiments of the present disclosure. The system 100 includes instructor device 102 that is used by a professor or instructor 101, student device 104 that is used by a student 103, educational service provider 106, and performance assistant 108 in communication over a network 160. Although only one instructor and one student are shown in FIG. 1, it should be understood that multiple instructors or multiple students (or both) may be included simultaneously or concurrently in the system 100, or that one instructor can interface with multiple students at a time or in sequence.

The educational service provider 106 generally includes a number of functional components for facilitating the provision of electronic learning services. For example, the educational service provider 106 generally includes one or more processing devices such as servers (not shown), each having one or more processors. The servers can be configured to send information (e.g., electronic files such as web pages) to be displayed on one or more devices (e.g., instructor device 102 and student device 104). The educational service provider 106 also generally includes one or more data storage devices (e.g., memory, etc.) (not shown) that are in communication with the servers, and could include a relational database, or other suitable data storage devices. The data storage devices may be configured to host data about the courses offered by the service provider 106 (e.g., the course frameworks, educational materials to be consumed by the student 103, records of assessments, background reading materials or information, ancillary materials, etc.).

In various examples, instructor device 102 and student device 104 may be implemented by any system suitable for videoconference communication, such as a videoconference camera, wireless telephone (e.g., cellular or mobile phone), a tablet, a personal digital assistant (PDA), a personal computer, a notebook computer, and/or various other generally known types of wired and/or wireless computing devices. In some embodiments, a telephone or other oral communication equipment can be used to collect communications from the instructor 101 and/or student 103. The systems need not be symmetric, and either the instructor 101 or student 103 may have a camera in their device 102, 104 while the other has access only to verbal communication equipment in their device 102, 104, but in one embodiment, they are symmetric. In another embodiment, the instructor device 102 and student device 104 include videoconference capability including video and audio signals.

The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet. Any suitable type of network to connect the interviewer and candidate may be used.

The instructor device 102 and the student device 104, in various embodiments, may be implemented using any appropriate combination of hardware and/or software configured for wired and/or wireless communication over the network 160. The instructor device 102, in one embodiment, may be utilized by the instructor 101 to interact with the educational service provider 106 and/or the performance assistant 108 over the network 160. Similarly, the student device 104 may be utilized by the student 103 to interact with educational service provider 106 and/or the performance assistant 108 over the network 160. In a preferred embodiment, a single network interacts with the instructor 101 and student 103, typically through the instructor and student devices 102, 104, and with the educational service provider 106 and performance assistant 108.

The instructor device 102 and the student device 104, in one embodiment, includes a user interface application (not shown), which may be used by the instructor 101 and/or the student 103 to conduct transactions or otherwise interact with the educational service provider 106 and/or the performance assistant 108.

In one implementation, the user interface application comprises a software program, such as a graphical user interface (GUI), executable by a processor that is configured to interface and communicate with the performance assistant 108 via the network 160. In another implementation, the user interface application comprises a browser module that provides a network interface to browse information available over the network 160. For example, the user interface application may be implemented, in part, as a web browser to view information available over the network 160.

Using the system 100, one or more students 103 and instructors 101 may communicate with the educational service provider 106 to participate in, create, and consume electronic learning services, including educational courses. In some cases, the educational service provider 106 may be part of (or associated with) a traditional "bricks and mortar" educational institution (e.g., a grade school, vocational school, university or college), another entity that provides educational services (e.g., an online university, a company that specializes in offering training courses, an organization that has a training department, etc.), or may be an independent service provider (e.g., for providing individual electronic learning). In various embodiments, the educational service provider 106 provides a platform for students to post communications to fellow students and/or the instructor 101. Communication between the student 103, the instructor 101, and the educational service provider 106 can occur either directly or indirectly using any one or more suitable devices.

In one or more embodiments, the performance assistant 108 is a networked system (e.g., an Internet web-based system accessible by instructor device 102 and student device 104) for predicting the performance of the student 103. In various embodiments, the performance assistant 108 is configured to receive a variety of communications, such as telephone calls, facsimile transmissions, e-mails, web interactions, voice over IP ("VoIP") and video.

As shown in FIG. 1, the performance assistant 108 includes database module 110, scoring module 120, performance prediction module 130, display module 140, and instructor monitoring module 150. The database module 110 is adapted to receive a communication posted by a student and/or an instructor. In some embodiments, the communication is received from the education service provider 106 and in other embodiments, the communication can be received directly from the student device 104 or instructor device 102. The database module 110 may be used to store various information or data required by the scoring module 120, performance prediction module 130, display module 140, and instructor monitoring module 150. The communication may be in the form of, e.g., an email, chat, instant message/MMS/SMS, video, audio clip, web-interaction (e.g., Facebook, YouTube, GooglePlus, or LinkedIn post), or a combination thereof. In one embodiment, the communication received is in a non-text format, so that non-text communications are converted to text before further processing.

The scoring module 120 is used to analyze and score the student and/or instructor communication(s). The scoring module 120 is adapted to apply linguistic algorithms to the text of the communication and to output a score. A linguistic algorithm(s) is typically created by linguistic analysts and such algorithm(s) are typically trained using previously analyzed communications. In one embodiment, the analyst(s) can review previous communications posted by previous students and manually label keywords or terms that are relevant to an identified predictor or student metric. The algorithm is trained to check for those keywords and the number of times they are used in the communications. A more sophisticated algorithm may be used that additionally checks for use of the keywords in context. One master algorithm containing many specific algorithms may also be used. The algorithms may be, e.g., specific to the education service provider 106, specific to a particular topic or educational course, or be general to all online educational content.

In some embodiments, the scoring module 120 scores a plurality of student metrics, which can be used to predict student performance. For example, the student metric can include personality type, student engagement, positive life events, negative life events, openness, a need for resources, or a combination thereof. These student metrics are used as predictors of student performance. In other words, whether or not the student exhibits student engagement, positive life events, negative life events, openness, or a need for resources is indicative of how he or she will perform in the class. In various embodiments, past or historical values for various student metrics may be taken into account.

In one embodiment, each online communication is scored for a number of student metrics. The scores may then be aggregated by student, by class, by instructor, by a certain time period, by student personality type, or by instructor personality type.

To score for personality type, the text of the student communication is subject to a linguistic-based psychological behavioral model to assess the personality of the student. For example, such a behavioral model may be applied to the transcription of a telephone call, online post, instant message, or email.

In one embodiment, data is mined for behavioral signifiers associated with a linguistic-based psychological behavioral model. In particular, the scoring module 120 searches for and identifies text-based keywords (i.e., behavioral signifiers) relevant to a predetermined psychological behavioral model. In a preferred embodiment, multiple channels (also referred to as multi-channels) are mined for such behavioral signifiers.

It is well known that certain psychological behavioral models have been developed as tools to evaluate and understand how and/or why one person or a group of people interacts with another person or group of people. The Process Communication Model™ ("PCM") developed by Dr. Taibi Kahler is a preferred example of one such behavioral model. Specifically, PCM presupposes that all people fall primarily into one of six basic personality types: Reactor, Workaholic, Persister, Dreamer, Rebel and Promoter. Although each person is one of these six types, all people have parts of all six types within them arranged like a "six-tier configuration." Each of the six types learns differently, is motivated differently, communicates differently, and has a different sequence of negative behaviors in which they engage when they are in distress. Importantly each PCM personality type responds positively or negatively to communications that include tones or messages commonly associated with another of the PCM personality types. Thus, an understanding of a student's PCM personality type offers guidance as to an appropriate responsive tone or message. Exemplary methods of applying a psychological behavioral model to communications are described in U.S. Pat. Nos. 7,995,717 and 8,094,803, and U.S. patent application Ser. No. 13/782,522, filed Mar. 1, 2013, entitled "Customer-Based Interaction Outcome Prediction Methods and System," the entire contents of each of which is incorporated herein in its entirety by express reference thereto.

Student engagement is another predictor of a student's performance. Engagement in an online learning environment may be more challenging, because students are not only isolated from their instructor and fellow students, but must be disciplined enough to ward off distractions. Engagement may be measured by analyzing text that is indicative of social connectedness, such as interaction/discussion posts, messages, emails, questions, answers, etc. Generally, the student engagement metric includes data elements that capture a student's graded or ungraded effort to learn through interactions and/or collaboration with one or more other students in the electronic learning system.

Student participation activities may also be analyzed, including posts in discussion forums, accessing course materials, deliverables, grades on assignments, completion of self-assessments, etc. In some embodiments, events such as log-in and log-off of students may be tracked to determine a student participation time cumulatively throughout the entire course or for portions of the course. The student participation time refers to the amount of time each student participates in an electronic course. Similarly, the durations of student-to-student interactions or student-to-instructor interactions may be timed.

Student engagement is evaluated by analyzing certain subcategories, such as argument investment, use of evidence, empathy, and/or encouragement. To determine whether or not the student demonstrates argument investment, the text of a student communication is analyzed to determine if the student expresses agreement or disagreement with an instructor or fellow student. For example, a student who takes a strong stance or opinion on an issue indicates that he or she is engaged in the classroom. Keywords or phrases that show argument investment include "I strongly believe," "I strongly disagree," "My view is that," "That is clearly wrong," and "I agree."

Student engagement is also shown by the use of evidence. The use of evidence is the use of facts from class or books to support an argument. Example phrases that show the use of evidence include "Based on," "Taking a look at," "Taking this/that into consideration," and "As evidenced by."

Student engagement can further be seen by empathy for another student or the instructor. Empathy is the ability to identify and understand another person's feelings or difficulties. For example, words that are indicative of empathy include "I understand," "Anyone would find this difficult," "Your reactions are normal," "Sorry to hear," and "I know this is hard."

Giving encouragement can also show that the student is engaged. The algorithm for encouragement looks for words that provide encouragement to other students or the instructor through positive language. Exemplary words, terms, and phrases that the algorithm searches for include "appreciate," "thanks," "thank you," "good/great/wonderful job," and "keep up the good work."

Life events is another student metric used as an input in the predictive model. Life events can affect attendance and task related activities. Life events are events that may prevent or hinder a student from fulfilling classroom obligations, and can be positive or negative. For example, life events that have a negative impact on student performance include excuses, hardships, difficulties, adversity, accidents, time commitments, distress, confusion, calls for help, and technical issues. A student is experiencing technical issues when the student is having trouble with technology he or she is supposed to use for the classroom. Students who do not have the skills needed for the electronic learning system may be more easily discouraged and less likely to engage. On the other hand, life events that have a positive impact on student performance include motivation, success, and recognition. Examples of words or phrases that indicate a negative life event include "I can't," "I'm unable," "I don't have time," and "I'm having a tough time." Exemplary words that show a positive life event include "I can," "I achieved," and "I received."

Yet another student metric that may be analyzed is openness. A student exhibits openness when he or she makes use of opportunities that are presented to him or her. For example, when the instructor indicates that he or she is there to help students or answer questions, this exhibits instructor openness. A student who is more open, particularly with an open instructor, can schedule an appointment with the instructor. The personality type of the instructor and student is typically a required consideration, as well, because a student will be less likely to schedule an appointment if their personality type does not match well with the instructor or if one of them is far less open (or more closed) of a personality than the other.

In addition, the need for resources is a student metric that can be measured and used in the predictive model. A student who needs resources (e.g., text books, financial aid, tutoring, counseling, etc.) can be identified, and the appropriate resources provided to the student. Keywords that show a need of the student include "I need," "I don't have enough," and "Help!"

Thus, the scoring module 120 may output a score for each of personality type, engagement, positive life events, negative life events, openness, and need for resources. The score for the student metric is typically either a yes or no, although certain scores can be numeric (e.g., a 1 or a 0 in this example) or on any other suitable scale for the factor being scored. For example, for student engagement, the score is either yes (the student demonstrates engagement), or no (the student does not demonstrate engagement). The score for personality type is an assessment of the personality type of the student.

The scoring module 120 may be configured to generate different scores at different times. For example, the scores may be updated at a given interval such as daily, weekly, monthly, or at other predefined intervals. In other examples, the scoring module 120 may be configured to generate scores upon request. This allows the scoring module 120 to provide a relatively current snapshot of the scores for students in the system. The scoring module 120 provides the scores for the various student metrics to the performance prediction module 130.

The performance prediction module 130 is adapted to use the score(s) for the different student metrics to predict the likelihood of a student outcome using a predictive model. The predictive model predicts the likelihood of a student achieving certain goals, such as failing or passing a course, or staying in or dropping out of a course. The predictive model is built using sample sets of previous scores of previous students in previous classes.

The performance prediction module 130 is also configured to generate a combined or aggregate performance score for a student based upon performance prediction scores for the various student metrics. The predictive model can take all the post scores (from the various student postings) and aggregate them in a variety of different ways, such as a score for that week, for all previous weeks, or even a trend for that student. With these scores, the model makes a prediction on the student's further success in the course. The changes in score over time through a portion or all of a course can also be tracked, which can spot problems with a particular student. Changes in score can also indicate that an instructor problem has arisen when a significant group of students' scores trend downwards at the same time.

In various embodiments, the scores can be aggregated by student personality type. These scores can give the instructor data on which student personality type the instructor is not effective with, and the model output can help allocate resources to (i) coach the instructor to be more effective with different personality types; (ii) direct students to instructors that will have compatible personality types to enhance the educational success of each; or both. Similarly, student scores can also be aggregated by instructor and used in the next enrollment cycle to predict which student personality type is the best fit with that instructor. This data can be used to guide future students for enrollment.

Moreover, the predictive model can indicate which students can benefit from extra coaching based on the scores from their online postings. The model can also predict which students are likely to drop out of the course, and allocate resources to help keep them in the course.

In various embodiments, the performance prediction module 130 also receives historical data from the database module 110. The historical data may include historical student scores and the corresponding data associated with one or more students who had previously completed one or more selected courses. In some embodiments, historical data may be obtained from various databases and data sources. For example, the historical data may be obtained from a single institution (e.g., educational service provider), a plurality of institutions, or one or more third party data services.

In some embodiments, historical data may include historical data associated with all of the courses in an institution. In other embodiments, historical data may include historical data associated with selected courses. The selected courses may be related to the current course. For example, the selected courses may have similar features (e.g., they use certain course resource types or are from the same faculty) or share a similar overarching theme (e.g., they are all mathematics courses, science courses, etc.).

After generation of the scores, the scores may be provided to the display module 140. The display module 140 is configured to generate one or more visual displays to convey the scores and/or student performance predictions to the instructor device 101 and/or student device 103.

In various embodiments, biographical and/or demographic data is also input into the predictive model. For example, classroom usage and participation data, age, educational background, marital status, gender, and educational program can be used to help predict the likelihood of a student outcome. A student who is older, for instance, may be more likely to complete the program and obtain a degree. A student who is married may be less likely to do well in a class because of responsibilities at home, and need more resources, or may be more financially stable and be more likely to do well in class. Thus, in some embodiments, one or more components of the student's biographical data, demographic data, or a combination thereof, are combined as a basis for the score.

In some embodiments, one or more of the modules 110, 120, 130, 140 may be configured to send a notification to a designated user of the system if a score is above or below a predefined value. For example, instructors, administrative staff, and/or the student may be notified of the scores. In various embodiments, the display module 140 may be configured to generate at least one visual display charting the student scores for that selected student relative to the historical scores.

Certain scores may be viewed as a risk indicator. For example, the scores may be used to determine whether the student is at-risk for poor academic performance or poor student engagement. This may be more advantageous than traditional systems that only rely on grades as an indication of performance. For example, it is possible that a student may be under-engaged even though he or she is receiving good grades. In such cases, the student may be at-risk of dropping out or having grades decrease over time because of this under-engagement, and remedial or corrective action can be suggested.

In addition to evaluating and scoring student communications, the present systems and methods can also evaluate and score instructor communications and teaching styles. In one embodiment, the instructor's personality type is determined in the same way the student personality type is determined. That is, linguistic analysis is performed on an instructor communication.

The instructor monitoring module 150 monitors the communications between an instructor and one or more students in an electronic course to measure instructor performance. For example, the instructor monitoring module 150 may track a student communication date to the instructor 101 and a corresponding instructor feedback date that the instructor provides complete or adequate feedback to the student. The student communication date and instructor feedback date may be determined on a student-by-student basis, an assignment-by-assignment basis, a class-by-class basis, or in another suitable manner. In one embodiment, the instructor is given a higher or better score if he or she responds to a student within 12 hours, 24 hours, or some other suitable pre-set time based on meaningful data for a given educational course.

A scoring algorithm can be applied to the instructor communication to detect keywords, terms, and phrases in the statements of the instructor to the student, and the communications can be scored based on the number of word hits. For example, the algorithm can look for words that provide specific advice or action items that a student can do to improve his or her performance or words that identify positive language that reinforces good behavior or performance.

In one embodiment, the instructor monitoring module 150 is configured to perform one or more of the following: (1) an analysis of discussion-facilitation between students or between students and the instructor; (2) an analysis of progress guidance to students by the instructor; (3) a quality of instructor postings that are accessible on a community or a common basis; (4) the quality of correspondence between an instructor and a student; and (5) the quality of deliverable feedback by the instructor to the student based upon work product or question submitted by the student.

In general, the instructor monitoring module 150 reviews instructor performance with a view toward the extent that the instructor facilitates electronic discussions between or among students; the degree that the instructor provides meaningful guidance to the students to promote full completion of the course; and the instructor's ability to direct a meaningful and content-directed discussion among course participants. The instructor monitoring module 150 may review instructor performance data, such as recorded excerpts of student-instructor communications, to determine if the instructor has built or attempted to build a suitable educational environment (e.g., working community) for the students through appropriate guidance of one or more students. If the instructor-student communications or other performance data evidences the encouragement of active student participation in a course, the provision of supplementary or explanatory materials on at least on an as-needed basis, and guidance to foster completion of the course materials, then the instructor monitoring module 150 may establish an evaluation report that reflects that the instructor promoted a suitable educational environment.

In another embodiment, the instructor monitoring module 150 may author or create an evaluation report that covers discussion facilitation and instructor guidance of the instructor based upon one or more of the following factors: (1) the extent that the teaching instructor motivates students to respond to classmate inquiries, (2) the extent to which the teaching instructor provides appropriate guidance via posted communications on an electronic bulletin board, (3) the extent that the instructor develops an on-line personality to foster student interaction and interest, such as injecting humor and levity into the discussion, (4) the extent that instructor monitors inter-student interaction and identifies correct responses and communications with respect to content exchange and informational exchange among the students, (5) the extent that the instructor monitors individual student participation and progress to identify existing and potential impediments to course completion, (6) the extent that the instructor makes a concerted effort to understand individual student circumstances that may affect course progression or detract from the ability of other students to learn, and (7) the ability of the instructor to provide targeted guidance via discussion communication, discussion posting, e-mails and deliverable feedback to ensure a rich and efficient learning opportunity.

In the evaluation report, the instructor monitoring module 150 may include an evaluation of the quality of postings of the instructor. The quality of the postings may include an evaluation of grammar of the language in the posting, the level of detail of the posting, the clarity of the posting, and the relevance of the posting to the course. The instructor monitoring module 150 may consider a posting relevant if the posting addresses the place that most students are in at the course at the time of the posting or if the posting applies to a current or previous discussion or e-mail communication between an instructor and a student or between multiple students.

In the evaluation report, the instructor monitoring module 150 may determine the degree of responsiveness of the instructor to individual e-mail inquiries, as well as the grammar, clarity, and relevance of the e-mail. The instructor monitoring module 150 may evaluate the instructor's feedback on the work product, assignments, or questions of the students. The instructor monitoring module 150 may evaluate the quality of the instructor's feedback to see if the instructor's communications are objective and justify grades assigned by the instructor to the student's work products. Further, the instructor monitoring module 150 may determine whether the instructor successfully identified areas for improvement of the student in the instructor feedback. The instructor monitoring module 150 may check to see whether the instructor identified any reading materials or any reference information in the course or tutorials in the course that would support a better understanding of the areas in which the student was deficient or needed improvement in the work product.

Figure 2:
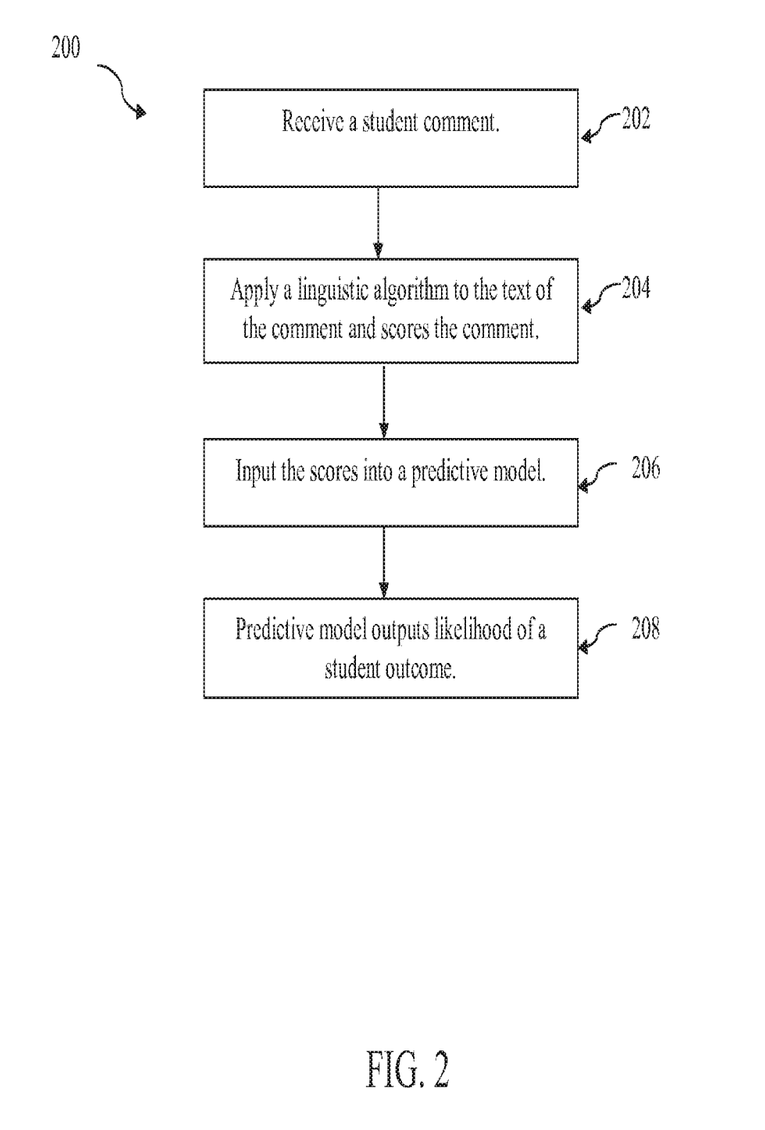
FIG. 2 is a flowchart illustrating a preferred method for predicting student performance according to aspects of the present disclosure.

An exemplary method 200 of predicting student performance according to the disclosure will now be described with respect to FIG. 2. At step 202, the database module 110 receives a communication posted by a student. In various embodiments, the communication is received from the educational service provider 106, but in other embodiments, the communication may be received from the student device 104, either directly or as a copy of what is sent to the instructor or educational service provider 106. The communication may be received in any form of electronic communication, including text based (email, text, web interaction) or recorded verbal (telephonic) communications or video based communications. In various embodiments, the non-text answers are converted to text before further processing. The database module 110 may store the communication for later use.

At step 204, at least one linguistic algorithm is applied to the text of the communication and a score is generated. The algorithm looks for specific terms, keywords and phrases (i.e., groups of keywords) that indicate a relevant predictor or student metric (e.g., personality type, student engagement, negative life events, positive life events, openness, need for resources, etc.) and the density of those terms in the communication.

In various embodiments, these terms, phrases, or keywords are stored in a library or libraries that are accessed by the scoring module 120. The library may separate the keywords, terms, and phrases into different student metrics. Keywords are the words previously determined to indicate the specific characteristic in the communication. Each keyword may have respective aliases, which are essentially synonyms of keywords. Synonyms of the keywords may be identified and also stored in the library. The aliases are typically treated as interchangeable with the keywords from a scoring perspective, but in one embodiment aliases can be treated as not interchangeable if specific words, terms, or phrases are expected to be used. Aliases may also be given relative scores next to a keyword, such as an alias valued at 0.6 or 1.2 of a keyword valued at 1. Also, due to the flexibility of the methods described herein, additional words, terms, and/or phrases may be added to the library at any time, such as based on additional communications, external analysis of business terminology in current news sources, or both. For example, when it becomes apparent that another word is used frequently and is just as effective as the associated keyword, the library may be updated to include this word as an acceptable alias, or may upgrade the relative value of that alias to 1 compared to the keyword if the algorithm tracks relative values.

The communications are scored by the scoring module 120. The scoring module 120 uses linguistic algorithms that are configured to detect keywords, terms, and phrases in the communications, and the communications are scored based on the number of word hits. The score can be assigned using any suitable grading scale such as a binary scale (e.g., yes or no), numeric scale, a three-level scale (i.e., high, medium, or low), an alphabetical scale or other scale created to rank the student's performance in a certain category. In one embodiment, a numeric scale can be used having a range of values from 1 to 10, where 1 indicates a minimum score and 10 indicates a maximum score. Other ranges can be used, such as 1 to 5 or 1 to 100, or A to C or A to F, or a combination of a numerical and letter scale to indicate different characteristics or weighting to different characteristics (e.g., an A2 is twice the importance of a lower score D1); no limitation is implied by the ranges given in this description.

At step 206, the performance prediction module 130 takes the scores and inputs them into a predictive model. At step 208, the predictive model outputs the likelihood of a student outcome based on the scores. For example, the predictive model indicates the probability that a student will pass or fail a course. The likelihoods or probabilities can then be used in decision-making processes. Once the probabilities are output, personalized corrective actions may be determined for the students who are at-risk. For example, corrective actions can include tutoring the student, recommending that the student change instructors or class time, providing counseling to the student, providing textbooks and other physical resources needed by the student, etc., or a combination thereof.

Figure 3:
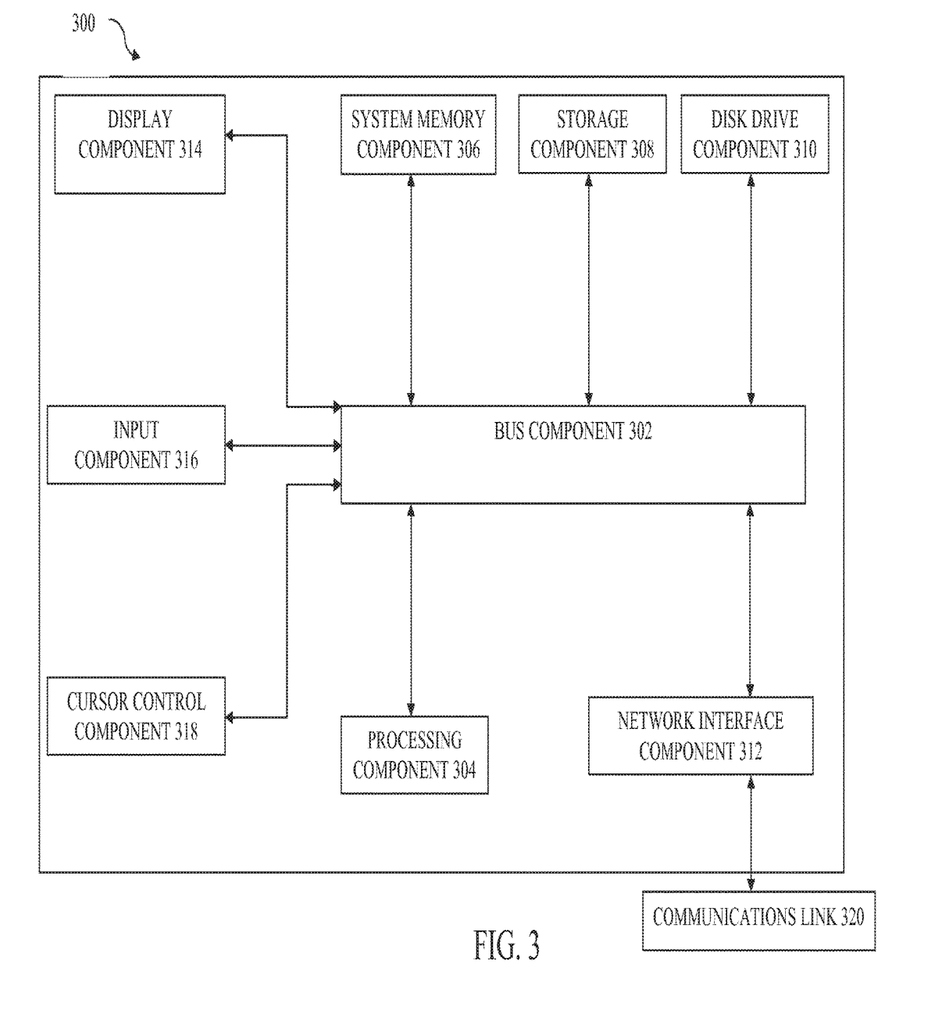
FIG. 3 is a block diagram of a computer system suitable for implementing one or more components in FIG. 1 according to an embodiment of the present disclosure.

Referring now to FIG. 3, illustrated is a block diagram of an evaluation system 300 suitable for implementing embodiments of the present disclosure, including interviewer device 102, candidate device 104, and interview assistant 106 depicted in FIG. 1. System 300, such as part a computer and/or a network server, includes a bus 302 or other communication mechanism for communicating information, which interconnects subsystems and components, including one or more of a processing component 304 (e.g., processor, micro-controller, digital signal processor (DSP), etc.), a system memory component 306 (e.g., RAM), a static storage component 308 (e.g., ROM), a network interface component 312, a display component 314 (or alternatively, an interface to an external display), an input component 316 (e.g., keypad or keyboard), and a cursor control component 318 (e.g., a mouse pad).

In accordance with embodiments of the present disclosure, system 300 performs specific operations by processor 304 executing one or more sequences of one or more instructions contained in system memory component 306. Such instructions may be read into system memory component 306 from another computer readable medium, such as static storage component 308. These may include instructions to receive a communication posted by a student, apply linguistic analysis to the text of the communication, output a score, display the score, predict a likelihood of a student outcome, etc. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 304 for execution. Such a medium may take many forms, including but not limited to, non-volatile media, volatile media, and transmission media. In various implementations, volatile media includes dynamic memory, such as system memory component 306, and transmission media includes coaxial cables, copper wire, and fiber optics, including wires that comprise bus 302. Memory may be used to store visual representations of the different options for searching or auto-synchronizing. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 300. In various other embodiments, a plurality of systems 300 coupled by communication link 320 (e.g., network 160 of FIG. 1, LAN, WLAN, PTSN, or various other wired or wireless networks) may perform instruction sequences to practice the disclosure in coordination with one another. Computer system 300 may transmit and receive messages, data, information and instructions, including one or more programs (i.e., application code) through communication link 320 and communication interface 312. Received program code may be executed by processor 304 as received and/or stored in disk drive component 310 or some other non-volatile storage component for execution.

In view of the present disclosure, it will be appreciated that various methods, apparatuses, computer readable media, and systems have been described according to one or more embodiments for predicting student performance.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow a quick determination of the nature of the technical disclosure. It is submitted with the understanding that it will not be used to interpret or limit the scope or meaning of the claims.

What is claimed is:

1. A system adapted to pair students with instructors for enrollment, comprising:
    a network server comprising a processor and a computer readable medium operably coupled thereto, the computer readable medium comprising a plurality of instructions stored in association therewith that are accessible to, and executable by, the processor, where the plurality of instructions comprises:
    instructions that, when executed, receive a plurality of student communications from a student device and receive a plurality of instructor communications from an instructor device;
    instructions that, when executed, apply a linguistic-based psychological behavioral model to the plurality of student and instructor communications to determine a personality type of the students and the instructors and to detect keywords and phrases used by the students and instructors;
    instructions that, when executed, apply a scoring algorithm to the detected student and instructor keywords and phrases;
    instructions that, when executed, generate scores using the linguistic-based psychological behavioral model, including a score that indicates a need for resources, for each of the student communications and for the instructor communications from comparison of the detected keywords and phrases with a plurality of keywords and phrases stored in a library on a server;
    instructions that, when executed, aggregate the student scores by personality type and by instructor;
    instructions that, when executed, correlate the aggregated student scores and instructor scores with historical student data;
    instructions that, when executed, create an evaluation report that provides guidance for a plurality of students for enrollment based on the correlated scores, wherein the report is displayed on the student device; and
    instructions that, when executed, direct resources to a student based on the score that indicates a need for resources.

2. The system of claim 1, further comprising instructions that, when executed, measure student engagement based on one or more of argument investment, use of evidence, empathy, encouragement, or a combination thereof, in at least one of the student communications.

3. The system of claim 1, which further comprises instructions that, when executed, predict a student outcome based on the applied psychologically-based linguistic analysis.

4. The system of claim 3, wherein each score predicts a likelihood of the student outcome.

5. The system of claim 4, wherein the student outcome comprises passing or failing a course, remaining or dropping out of a course, or a combination thereof.

6. The system of claim 4, further comprising instructions that, when executed, combine student biographical data, demographic data, or a combination thereof, with the score to predict a likelihood of the student outcome.

7. The system of claim 1, which further comprises instructions that, when executed, further aggregate scores for a selected time period, for a selected class, or a combination thereof.

8. A method for pairing students with instructors for enrollment, which comprises:
    receiving, at a network server from a student device and an instructor device, a plurality of student and instructor communications;
    applying, at a network server, a linguistic-based psychological behavioral model to the plurality of student and instructor communications to determine a personality type of the students and the instructors and to detect keywords and phrases used by the students and instructors;
    applying, at a network server, a scoring algorithm to the detected student and instructor keywords and phrases;
    generating using the linguistic-based psychological behavioral model, at a network server, scores, including a score that indicates a need for resources, for each of the student communications and for the instructor communications from comparison of the detected keywords and phrases with a plurality of keywords and phrases stored in a library on a server;
    aggregating, at a network server, the student scores by personality type and by instructor;
    correlating, at a network server, the aggregated student scores and instructor scores with historical student data;
    creating, at a network server, an evaluation report that provides guidance for a plurality of students for enrollment based on the correlated scores;
    displaying the evaluation report on the student device; and
    directing resources to a student based on the score that indicates a need for resources.

9. The method of claim 8, which further comprises measuring student engagement based on one or more of argument investment, use of evidence, empathy, encouragement, or a combination thereof, in at least one of the student communications.

10. The method of claim 8, which further comprises predicting a student outcome based on the applied psychologically-based linguistic analysis.

11. The method of claim 10, wherein each score predicts a likelihood of the student outcome.

12. The method of claim 11, which further comprises combining student biographical data, demographic data, or a combination thereof, with the score to predict a likelihood of the student outcome.

13. The method of claim 10, wherein the student outcome comprises passing or failing a course, remaining or dropping out of a course, or a combination thereof.

14. The method of claim 8, which further comprises aggregating scores for a selected time period, for a selected class, or a combination thereof.

15. A network server comprising a non-transitory, computer-readable medium comprising:
- instructions that, when executed, receive a plurality of student communications from a student device and a plurality of instructor communications from an instructor device;
- instructions that, when executed, apply a linguistic-based psychological behavioral model to the plurality of student and instructor communications to determine a personality type of the students and the instructors and to detect keywords and phrases used by the students and instructors;
- instructions that, when executed, apply a scoring algorithm to the detected student and instructor keywords and phrases;
- instructions that, when executed, generate scores using the linguistic-based psychological behavioral model, including a score that indicates a need for resources, for each of the student communications and for the instructor communications from comparison of the detected keywords and phrases with a plurality of keywords and phrases stored in a library on a server;
- instructions that, when executed, aggregate the student scores by personality type and by instructor;
- instructions that, when executed, correlate the aggregated student scores and instructor scores with historical student data;
- instructions that, when executed, create an evaluation report that provides guidance for a plurality of students for enrollment based on the correlated scores, wherein the report is displayed on the student device; and
- instructions that, when executed, direct resources to a student based on the score that indicates a need for resources.

16. The network server of claim 15, further comprising instructions that, when executed, measure student engagement based on one or more of argument investment, use of evidence, empathy, encouragement, or a combination thereof, in at least one of the student communications.

17. The network server of claim 15, which further comprises instructions that, when executed, predict a student outcome based on the applied psychologically-based linguistic analysis.

18. The network server of claim 17, wherein each score predicts a likelihood of the student outcome.

19. The network server of claim 18, wherein the student outcome comprises passing a course, remaining in a course, or a combination thereof.

20. The network server of claim 15, which further comprises instructions that, when executed, further aggregate scores for a selected time period, for a selected class, or a combination thereof.

* * * * *